Jan. 8, 1929.

W. J. HAGMAN 1,698,589

POWER DRIVEN RAILWAY TRUCK

Original Filed June 24, 1925    2 Sheets-Sheet 1

Inventor:
William J. Hagman,
by his Attorneys,
Howson & Howson

Jan. 8, 1929.  1,698,589
W. J. HAGMAN
POWER DRIVEN RAILWAY TRUCK
Original Filed June 24, 1925   2 Sheets-Sheet 2
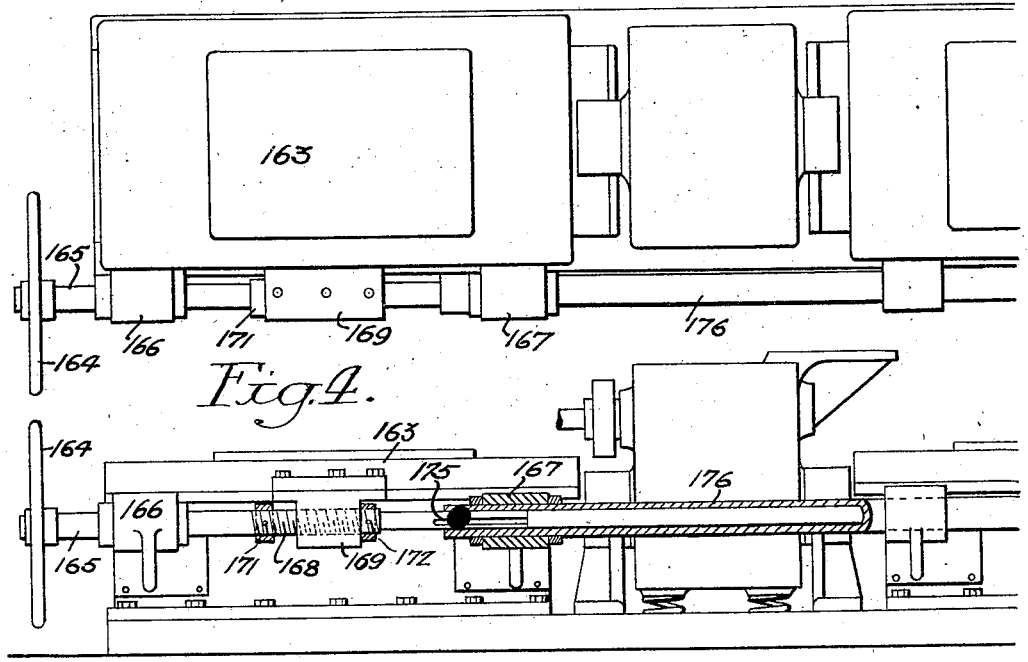

Patented Jan. 8, 1929.

1,698,589

UNITED STATES PATENT OFFICE.

WILLIAM J. HAGMAN, OF PHILADELPHIA, PENNSYLVANIA.

POWER-DRIVEN RAILWAY TRUCK.

Original application filed June 24, 1925, Serial No. 39,353. Divided and this application filed April 20, 1926. Serial No. 103,289.

My invention relates to driving mechanisms, and it has particular relation to such mechanisms as are applicable to railway trucks.

Reference is herein made to my co-pending application, Serial No. 39,353, filed June 24, 1925, of which this application is a division.

One object of my invention is to provide a simple efficient drive for trucks, which is characterized by the absence of universal joints and complicated parts; by the ease of repair; and by its adaptability to present-day car trucks without necessitating material alterations in the same.

Another object of my invention is to provide means whereby the thrust of the driving element on the truck and car structure may be substantially neutralized.

A further object of my invention is to provide means whereby a proper working relation may be insured between the power device and the truck structure as the latter swivels relative thereto.

With these and other objects and applications in mind, my invention further consists in the details of construction and operation and arrangement, hereinafter described and claimed and illustrated in the accompanying drawings, wherein Fig. 1 is a side elevational view of a car embodying my invention, wherein the primary source of power is a gas engine;

Fig. 3 is a plan view of the structure of Fig. 2;

Fig. 4 is a side elevational view, partially in section, of the structure of Fig. 3.

Figure 1:
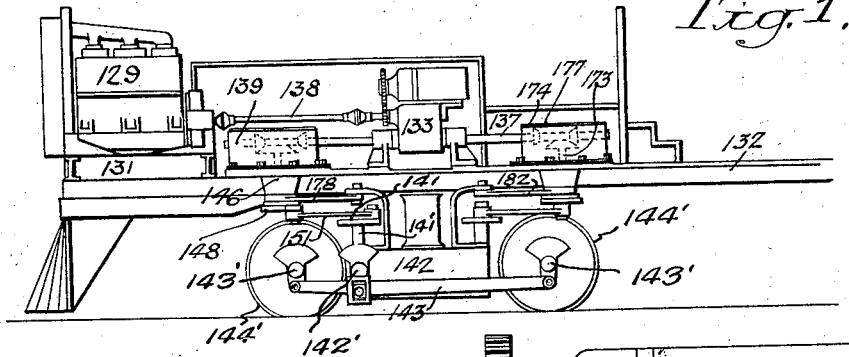
Figure 2:
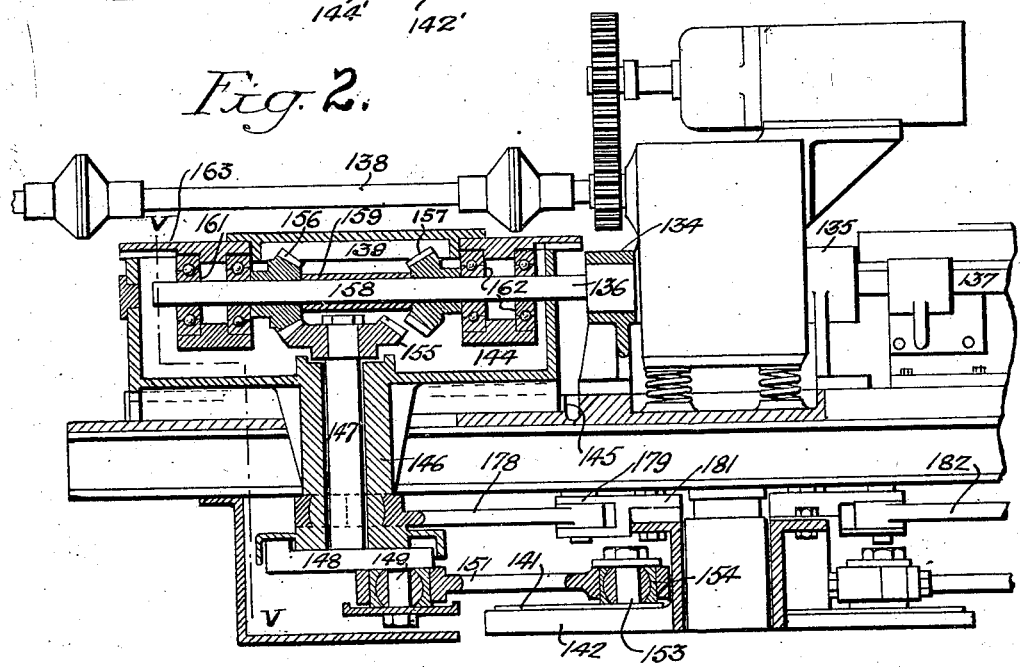
Fig. 2 is a detail elevational view, partially in section, of the slidable gear box of Fig. 1 and mechanism directly connected therewith.
Figure 5:
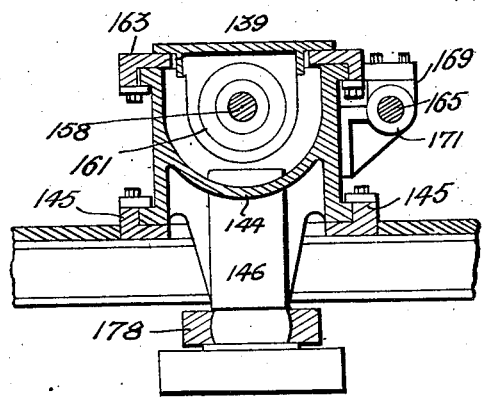
Fig. 5 is a transverse sectional view taken on the line 5—5 of Fig. 2.

Referring to Figs. 1 to 5, inclusive, a gas engine 129 is mounted on a forward end 131 of a car body 132. A transmission box 133 of usual design is pivotally mounted on bearings 134 and 135, which respectively support shaft sections 136 and 137. A driving shaft 138 extends between the gas engine 129 and the transmission box 133.

In accordance with my invention, the shaft section 136 is connected through a gear box or so-called power device 139 with a horizontally positioned crank disk 141. The crank disk 141 may be mounted on a swiveling truck 142, and it is operatively associated with a side bar 143 by means of connected vertical and horizontal shaft sections 141' and 142'.

The truck 142 is also provided with axles 143' and traction wheels 144' therefor. The power apparatus 139 comprises a casing 144, which is mounted for longitudinal movement in ways 145 on the car body 132. A depending portion 146 affords a bearing for a bodily movable vertical shaft 147, the lower end of which carries a horizontally positioned crank disk 148 and a pin 149. A connecting rod 151, which is disposed in the swiveling plane of the truck 142, has one end thereof mounted on the pin 149 by means of a bearing 152 which is designed to permit a slight relative movement between said pin 149 and said connecting rod 151. The opposite end of the connecting rod 151 is mounted on a crank pin 153 by means of a similar bearing 154.

The upper end of the vertical shaft 147 carries a bevel gear-wheel 155 which is adapted to mesh successively with bevel gear-wheels 156 and 157. The bevel gear-wheels 156 and 157 are mounted on an inner end 158 of the shaft 136 and spaced by a sleeve 159. Bearings 161 and 162 serve to support the shaft end portion 158 immediately adjacent to the bevel gear-wheels 156 and 157, respectively, said bearings being mounted on a cover member 163 slidably mounted on the casing 144.

A hand wheel 164 is mounted on a shaft 165 which is journaled in bearings 166 and 167 carried by the cover member 163 and it is provided with a threaded portion 168 which engages a nut portion 169 of said cover member 163. Collars 171 and 172 are spaced on opposite sides of the nut portion 169, so that when the hand wheel 164 is turned in one direction, the cover member 163 is actuated to cause the bevel gear-wheel 156 to mesh with the bevel gear-wheel 155. When the hand wheel 164 is turned in the opposite direction, the bevel gear wheel 157 is carried to mesh with the main bevel gear-wheel 155. Thus, the direction of rotation of the shaft 147 may be controlled and hence the direction of movement of the truck 142.

When it is desirable to control substantially simultaneously the direction of operation of the shaft section 147 of the power device 139 and a corresponding shaft section 173 of a power device 174 (Fig. 1), the shaft 165 is splined at 175 to a shaft 176 which is adapted to move a cover member 177 and thereby control the direction of operation of the shaft 173 in the manner described above for the power device 139. The splined connection 175 between the shaft sections 165 and 176 permits such relative movement between the slidable power devices 139 and 174 as may obtain when the truck 142 swivels with respect thereto.

The bodily movable vertical shaft 173 is similarly associated with a side bar (not shown) on the opposite side of the truck 142, but in 90° relation to the side bar 143. As will be apparent, by connecting each power device to one side only of the truck 142, the lost motion of each unit is absorbed.

A compensating link 178, which is positioned in the swiveling plane of the truck 142, has one end pivotally mounted on the depending portion 146 of the slidable power device 139. The other end is connected to a bifurcated end portion 179 of a block 181 mounted on the truck 142. Thus, the thrust of the horizontal connecting bar 151 is neutralized. A similar horizontal compensating bar 182 is also provided for the other power unit 174. The power devices 139 and 174 are hence retained by the compensating bars 178 and 182, respectively, in proper working relation to the truck 142 as the latter swivels.

While I have shown one form of embodiment of my invention, for the purpose of describing the same and illustrating its principles of construction and operation, it is apparent that various changes and modifications may be made therein without departing from the spirit of my invention, and I desire, therefore, that only such limitations shall be imposed thereon as are indicated in the appended claims or as are demanded by the prior art.

I claim:

1. A movable truck, a movable gear box having a driving connection with said truck, and means operative in the plane of movement of said truck for insuring a proper operative relation between said truck and said gear box.

2. A movable gear box, a truck, and a link for causing a movement of said gear box upon a desired movement of said truck.

3. A bodily movable gear box, a truck, and a link positioned in substantially a horizontal plane for insuring a desired operating relation between said gear box and said truck.

4. A car body, a gear box slidably mounted thereon, a swiveling truck, and means for causing a bodily movement of said gear box relative to said truck upon the swiveling of the latter.

5. A car body, a gear box mounted thereon for movement longitudinal of said car body, and means for causing said longitudinal movement upon the swiveling of said truck, whereby proper operative relation may be assured between said truck and said gear box.

6. A truck having one movement, and a gear box having a driving connection with said truck and adapted to have a different movement, one of said movements causing the other.

7. A car body having a gear box mounted thereon for longitudinal movement, and a truck having a swiveling movement, one of said movements causing the other.

8. A bodily movable gear box having driving parts, a relatively movable member having traction elements constituting driven parts, and means for operatively associating said driving and driven parts, said gear box being moved relative to said member upon a movement of the latter.

9. A car body having a gear box movably mounted thereon, said gear box having driving parts, a swiveling truck provided with driven parts, and means operative in the swiveling plane of said truck for connecting said driving and driven parts.

10. A car body having a gear box slidably mounted thereon provided with driving parts, a truck having driven parts, and a connecting link extending between said driving and driven parts.

11. A car body having a gear box slidably mounted thereon provided with driving parts, a truck having driven parts, and a connecting link extending between said driving and driven parts, said connecting link being operative in substantially a horizontal plane.

12. A car body having a gear box movably mounted thereon, said gear box being provided with driving parts, a truck having driven parts, means for operatively associating said parts, and means for maintaining a proper operating relation between said gear box and said truck.

13. A car body having a gear box movably mounted thereon, said gear box being provided with driving parts, a truck having driven parts, means for operatively associating said parts, and means for causing the proper operating relation between said gear box and said truck.

14. A body carrying a bodily movable gear box provided with driving parts, a supporting truck having driven parts, means for operatively associating said parts, and means adapted to cause a bodily movement of said gear box upon a movement of said truck, said means being positioned in the swinging plane of said truck.

15. A bodily movable gear box having driving parts, a truck having driven parts, a connecting rod for operatively associating said parts positioned to move in substantially the swinging plane of the truck, and means for insuring a proper operating relation between said driving and driven parts upon a certain movement of said truck.

16. A bodily movable gear box having driving parts, a truck having driven parts, a connecting rod for operatively associating said parts positioned to move in substantially the swinging plane of the truck, and a link positioned in substantially a horizontal plane for causing a bodily movement of said driving parts upon a certain movement of said driven parts.

17. A pair of gear boxes having one movement, a pair of traction elements having a different movement, and means for respectively associating said gear boxes and said traction elements, one of said movements causing the other.

18. A pair of gear boxes having a substantially longitudinal movement, a pair of mechanically interconnected traction elements having a swiveling movement, and means whereby one of said movements may cause the other.

19. A truck having a plurality of axles, a body, and a plurality of gear boxes mounted on said body and operatively associated with said axles, respectively, said gear boxes being movable upon the swiveling of said truck.

20. An axle, a truck, a body, a gear box movably mounted on said body, and mechanism for operatively interconnecting said gear box and one end of said axle, said gear box being movable upon the turning of said truck.

21. A truck having a plurality of pairs of wheels, sets of side bars operatively associating said wheels, a body, a gear box movably mounted on said body, and means operatively associating said gear box and one set of said side bars, said gear box being movable upon a swiveling movement of said truck.

22. Power apparatus including a bodily movable shaft and a crank, a truck having driven parts, and means for operatively associating said crank and said driven parts, said shaft being moved bodily relative to said truck upon a predetermined movement of the latter.

23. Power apparatus including a bodily movable vertical shaft and a crank, a truck having driven parts including a shaft, and means for operatively associating said last-mentioned shaft and said crank, said first-mentioned shaft being moved relative to said second-mentioned shaft upon a predetermined movement of said truck.

24. In combination, power apparatus including a substantially vertical shaft positioned for bodily movement, a truck having driving parts including a substantially vertically positioned shaft, and means for operatively associating said shafts positioned in substantially the plane of movement of said truck.

25. The combination with power apparatus including a substantially vertically positioned bodily movable shaft, of a truck having driving parts including a substantially vertically positioned shaft, and means including a connecting link for operatively associating said shafts.

26. A car body having mounted thereon power apparatus including a substantially vertically positioned bodily movable shaft, a truck having driven parts, and means including a link for operatively associating said shaft and said driven parts, said shaft having a movement relative to said truck upon a predetermined movement of the latter.

27. A car body having mounted thereon power apparatus including a substantially vertically positioned bodily movable shaft, a swiveling truck having driving parts, and means for operatively associating said shaft and said driving parts including a connecting rod positioned in substantially the swiveling plane of said truck.

28. The combination with a car body having power apparatus mounted thereon provided with a substantially vertically positioned bodily movable shaft, a swiveling truck having driven parts, means for operatively associating said shaft and said parts including a connecting rod, and means for causing a bodily movement of said shaft upon the swiveling of said truck.

29. The combination with a body having power apparatus provided with a substantially vertically positioned bodily movable shaft, of a swiveling truck having driven parts, means for operatively associating said shaft and said driven parts, and a connecting link for causing a bodily movement of said shaft upon the swiveling of said truck.

30. A body having power apparatus mounted thereon provided with a bodily movable shaft, a truck having driven parts, means for operatively associating said driven parts and said shaft including a connecting rod positioned to move in substantially the swiveling plane of said truck, and a connecting link also operative in the truck swiveling plane for causing a bodily movement of said shaft upon the swiveling of said truck.

31. In combination, a body, power apparatus including a shaft movably carried by said body, a swiveling truck having driven parts including a shaft, means for operatively associating said shafts including a connecting rod, and a compensating link for causing a bodily movement of said first-mentioned shaft relative to said second-mentioned shaft upon the swiveling of said truck.

32. In combination, a body, power apparatus including a shaft movably carried by said body, a swiveling truck having driven parts including a shaft, means for operatively associating said shafts including a connecting rod, and a compensating link for causing a bodily movement of said first-mentioned shaft relative to said second-mentioned shaft upon the swiveling of said truck, said connecting rod and link being positioned in substantially the swiveling plane of said truck.

33. A truck having a plurality of axles, a body, and a plurality of driven shafts movably mounted on said body and operatively associated with said axles, respectively, said shafts being movable relative to said truck upon the swiveling of the latter.

34. A truck having a plurality of pairs of wheels, sets of side bars operatively associating said wheels, a body, a driving shaft movably mounted on said body, and means operatively associating said shaft and one set of side bars, said shaft being movable relative to said truck upon the swiveling thereof.

35. A truck having pairs of axles, the opposite ends of which are respectively connected by sets of side bars, power apparatus including a shaft bodily movable relative to said truck when the latter swivels, and means for operatively connecting said shaft with one of said sets of side bars.

36. The combination with a car body carrying power apparatus including a pair of shafts movably mounted on said car body, a truck movable relative to said car body, a pair of axles, sets of side bars connecting corresponding ends of said axles, and means including shafting for operatively associating said pair of shafts and said sets of side bars, respectively.

37. The combination with a supporting member having interconnecting vertical and horizontal shaft sections, of a member movable bodily relative to at least one of said shaft sections, and a vertical shaft supported by said bodily movable member having a driven connection with one of said shaft sections.

38. A truck having horizontal and vertical shaft sections, an axle positioned to be driven by one of said shaft sections, and a driving shaft section operatively associated with the other of said shaft sections, said driving shaft section being bodily actuated when said truck moves in a predetermined manner.

39. A truck having a pair of axles, side bars for connecting said axles, shafts including horizontal and vertical sections respectively connected to said side bars, and a pair of power devices having shafts respectively connected with said first-mentioned shafts, the latter being bodily movable upon a predetermined movement of said truck.

40. A swiveling truck having driving parts, a car body, a crank movably mounted on said car body, and means for insuring a proper working relation between said crank and said truck as the latter swivels.

41. A swiveling truck having driving parts, a car body, a crank movably mounted on said car body, and means for operatively associating said crank and said driving parts, said means being operative in the swiveling plane of said truck.

42. A swiveling truck having driving parts, a car body, a crank movably mounted on said car body, means for operatively associating said crank and said driving parts, said means being operative in the swiveling plane of said truck, and means for insuring a proper working relation between said crank and said driving parts as the truck swivels.

43. A car body providing a support for a crank, a swiveling truck also provided with a crank, and a connecting rod extending between said cranks and operative in the swiveling plane of the truck.

44. A swiveling truck, a car body, a crank movably mounted on said car body, a crank on said truck operatively associated therewith, and means for insuring a proper working relation between said cranks as the truck swivels.

45. A swiveling truck, a car body, a crank movably mounted on said car body, a crank on said truck operatively associated therewith, and means for insuring a proper working relation between said cranks as the truck swivels, said cranks and said means being operative in substantially the swiveling plane of said truck.

46. In a device of the class described, a car body, a swiveling truck, control means including a gear box slidably mounted on said car body, mechanism on said truck operatively associated with said car body, and means for insuring a proper working relation between said gear box and said truck upon the swiveling of the latter.

47. A car body having a driving crank movably mounted thereon, a swiveling truck having driven parts, means for actuating said crank as the truck swivels so as to insure a desired working relation between said crank and said driven parts, and means for controlling the direction of operation of said crank.

48. In combination, a swiveling truck, a car body, a driving crank movably mounted on said car body, a driven crank mounted on said truck, means for moving said first-mentioned crank as said truck swivels so as to insure a proper working relation with said second-mentioned crank, and means for controlling the direction of operation of said first-mentioned crank.

49. A car body having a bodily movable gear box, a swiveling truck having driven parts, means for operatively associating said gear box and said driven parts, said gear box being bodily movable relative to said truck upon the swiveling thereof, and means for controlling the direction of operation of said driven parts.

50. The combination with a car body having a gear box movably mounted thereon, of a truck having driven parts, means for operatively associating said gear box and said driven parts, a neutralizing link adapted to cause a bodily movement of said gear box when said truck moves in a predetermined manner, and means carried by said gear box for controlling the direction of operation of said driven parts.

51. A body having power apparatus provided with a vertical bodily movable shaft and a driving crank, a truck having driven parts, means for operatively associating said crank and said driven parts, said shaft being bodily movable upon the relative movement of said truck, and means for controlling the direction of operation of the driven parts.

52. A bodily movable gear box including a shaft section, a swiveling truck having driven parts, means for operatively associating said shaft and said driven parts, and a compensating link extending between said truck and said gear box for causing a movement thereof relative to said driven parts upon the swiveling of said truck.

53. A bodily movable gear box including a shaft section, a swiveling truck having driven parts, means for operatively associating said shaft and said driven parts, a compensating link extending between said truck and said gear box for causing a movement thereof relative to said driven parts upon the swiveling of said truck, and means for controlling the direction of operation of said shaft section.

54. A car body having a bodily movable casing supporting a shaft, a cover for said casing carrying a driving shaft, means whereby said first-mentioned shaft may be actuated in opposite directions for different positions of said cover, and a truck having driving parts connected to said first-mentionel shaft.

55. A car body having a bodily movable casing supporting a shaft, a cover for said casing carrying a driving shaft, means whereby said first-mentioned shaft may be actuated in opposite directions for different positions of said cover, a truck having driving parts connected to said first-mentioned shaft, and a compensating link extending from said truck to said casing for insuring a proper operating relation therebetween.

56. Apparatus comprising a car body for movably supporting driving parts including a gear box and a shaft terminating in a crank, a swiveling supporting truck for said car body having driven parts, a connecting rod extending between said crank and said driven parts, and a link for causing a bodily movement of said shaft upon the swiveling of said truck, said connecting rod and link being positioned in substantially a horizontal plane.

WILLIAM J. HAGMAN.